United States Patent [19]

Payer et al.

[11] Patent Number: 4,928,720
[45] Date of Patent: May 29, 1990

[54] COPOLYMERS OF ETHYLENE AND METHOXYACETIC ACID VINYL ESTER AND THEIR USE AS ADDITIVES FOR MINERAL OIL DISTILLATES

[75] Inventors: Wolfgang Payer, Wesel; Heinz D. Bühnen; Wilhelm Zoller, both of Oberhausen, all of Fed. Rep. of Germany

[73] Assignee: Hoechst Aktiengesellschaft, Oberhausen, Fed. Rep. of Germany

[21] Appl. No.: 379,370

[22] Filed: Jul. 13, 1989

Related U.S. Application Data

[60] Division of Ser. No. 372,235, Jun. 26, 1989, which is a continuation of Ser. No. 248,549, Sep. 23, 1988, abandoned.

[30] Foreign Application Priority Data

Sep. 29, 1987 [DE] Fed. Rep. of Germany ....... 3732721

[51] Int. Cl.$^5$ ............................................. C08L 31/00
[52] U.S. Cl. ..................................... 137/13; 526/320; 524/558; 252/56 R; 252/56 S
[58] Field of Search ........................................ 526/320

[56] References Cited

U.S. PATENT DOCUMENTS 4,556,499 12/1985 Heier et al. ............................ 44/62

Primary Examiner—Joseph L. Schofer
Assistant Examiner—Jeffrey T. Smith
Attorney, Agent, or Firm—Jordan B. Bierman

[57] ABSTRACT

Copolymers consisting of 95 to 50 weight percent of ethylene and 5 to 50 weight percent of methoxyacetic acid vinyl ester and having a molecular mass from 500 to 10,000 g×mole$^{-1}$. Methods for preparation and use are also disclosed. The copolymers are used as flow improvers for mineral oil distillates, in particular mineral oil middle distillates.

7 Claims, No Drawings

COPOLYMERS OF ETHYLENE AND METHOXYACETIC ACID VINYL ESTER AND THEIR USE AS ADDITIVES FOR MINERAL OIL DISTILLATES

This application is a division of application Ser. No. 372,235, filed June 26, 1989, which is a continuation of application Ser. No. 248,549, filed Sept. 23, 1988, now abandoned.

The present invention relates to copolymers of ethylene and methoxyacetic acid vinyl ester with an average molecular mass of 500 to 10,000 g x mole$^{-1}$. They are used successfully to improve the flowability of mineral oils and mineral oil distillates.

BACKGROUND OF THE INVENTION

Crude oils and middle distillates recovered through the distillation of crude oils, such as gas oil, diesel oil or fuel oil contain, depending on the origin of the crude oils, different amounts of dissolved long-chain paraffins (waxes). At low temperatures, these paraffins crystallize out as flake-like crystals, partly with oil inclusions. This considerably impairs the flowability of the crude oils and the distillates recovered from them. Solid deposits occur which often lead to breakdown during the recovery, transportation and use of mineral oil products. For example, in the cold season, the filters of diesel engines, furnaces, and boiler plants often become clogged, thus preventing reliable dosing of the fuel and ultimately resulting in complete breakdown of the fuel supply. The transportation of middle distillates over large distances in pipes can also be impaired in winter due to the paraffin crystals separating out.

It is known that undesired crystal growth can be prevented by suitable additives. Such additives, which are known under the terms pour-point depressants and flow improvers, change the size and shape of the wax crystals and thus counteract the increase in viscosity of the oils.

The flow and cold behavior of mineral oils and mineral oil distillates is indicated by the pour point (determined according to DIN 51597) and the cold filter plugging point (CFPP, determined according to DIN 51428). Both values are measured in °C.

Typical flow improvers for crude oil and middle distillates are copolymers of ethylene with carboxylic acid esters of vinyl alcohol. Thus, according to DE 11 47 799 B1, oil-soluble copolymers of ethylene and vinyl acetate having a molecular weight of between about 1,000 and 3,000 are added to crude oil distillate road and heating fuels with a boiling range of about 120° to 400° C. Copolymers containing about 60 to 99 weight percent of ethylene and about 1 to 40 weight percent of vinyl acetate have proved particularly suitable.

Furthermore, it is known that those of the above copolymer compositions which are particularly effective have been prepared by radical polymerization in an inert solvent at temperatures of about 70° to 130° C. and pressures of 35 to 2,100 atmospheres above atmospheric pressure (DE 19 14 756 B2).

The subject matter of the DE 21 02 469 C2 is the use of ethylene copolymers having a molecular weight of 500 to 4,500 and a comonomer content of 30 to 75 weight percent. They are obtained by joint polymerization of ethylene and vinyl esters having 4 to 10 carbon atoms, together with acrylic acid and methacrylic acid esters derived from alcohols having 1 to 12 carbon atoms, in the absence of solvents and emulsifiers.

The effectiveness of the known additives in improving the properties of mineral oil fractions depends on the origin of the mineral oil from which they were obtained and thus on their composition. Prior art additives, which are admirably suitable for adjusting certain characteristic values of fractions of one crude oil, can produce completely unsatisfactory results with distillates of crude oils of a different origin.

For economic reasons, there is interest in increasing the yield of middle distillate road and heating fuels. One way of achieving this is to add higher percentages of heavy gas oil to the middle distillate blends. Another possibility of improving the middle distillate yield consists in increasing the boiling interval, i.e. separating middle distillate fractions which cease boiling above 370° C. Both processes lead to an increase in the higher molecular weight n-paraffin percentage in the middle distillate road or heating fuel. The known additives, such as copolymers of ethylene and vinyl acetate, lead to an unsatisfactory improvement in the flowability of middle distillate fractions which cease boiling above 370° C.

BRIEF DESCRIPTION OF THE PRESENT INVENTION

Therefore the problem to be solved was the preparation of additives, which improve the flowability of crude oil fractions, especially those which cease boiling above 370° C.

The subject matter of the invention is copolymers consisting of 95 to 50 weight percent of ethylene and 5 to 50 weight percent of methoxyacetic acid vinyl ester with an average molecular mass ($M_n$) of 500 to 10,000 g x mole$^{-1}$. The invention also comprises the use of these copolymers to improve the flowability of mineral oil distillates.

Surprisingly, the copolymers claimed in the invention have proved admirably suitable for improving the flowability of mineral oil distillates. Their wide applicability, i.e. their effectiveness with mineral oil distillates of different origins, different composition and different boiling behavior, deserves special mention.

In principle, the copolymers according to the invention can be used as flow improvers both in crude oils and in the processed crude oil products recovered by distillation. However, their use in mineral oil distillates, in particular mineral oil middle distillates, is preferred. These are understood to be hydrocarbon fractions which boil between 150° and 400° C. Examples of such crude oil distillates are petroleum, light heating oils, and diesel fuels. Middle distillates, such as extra light heating oil and diesel fuel are of special importance.

DETAILED DESCRIPTION OF THE PRESENT INVENTION

Copolymers containing 90 to 65 weight percent of ethylene and 10 to 35 weight percent of methoxyacetic acid vinyl ester have proved particularly suitable as flow improvers.

Apart from the composition, a major criterion of the new copolymers is the average molecular mass ($M_n$). It is measured in a steam phase osmometer using toluene as a solvent and is 500 to 10,000 g x mole$^{-1}$. Copolymers with an average molecular mass of 1000 to 5000 g x mole$^{-1}$ are preferably used as flow improvers.

Mixtures of monomers are used to prepare the ethylene-methoxyacetic acid vinyl ester copolymers according to the invention. Methoxyacetic acid vinyl ester is a colorless liquid which can, for example, be obtained by introducing acetylene into methoxyacetic acid in the presence of mercury oxide, boron trifluoride and anhydrous fluoride (DE-PS 604 640, 1933). The polymerization of the starting materials takes place according to known processes (cf. also Ullmans Encyclopaedie der Technischen Chemie, 4th Edition, Volume 19, Pages 169 to 178) in the presence of initiators such as oxygen and/or peroxides. The monomers are reacted at pressures above 50 MPa and at temperatures between 100° and 350° C. The average molecular mass of the copolymers is adjusted by varying the reaction pressure and temperature with a given composition of the monomer mixture.

The German patent discloses the production of the vinyl ester of methoxyacetic acid. It states that methoxyacetic acid is mixed with mercuric oxide, boron trifluoride, and anhydrous hydrofluoric acid. Acetylene is then introduced into the mixture until no more gas is taken up. Thereafter, the methoxyacetic acid vinyl ester which has been obtained is distilled in a column under vacuum. The distillate is released by a second distillation of small fractions of acid. The ester is obtained as a colorless liquid which boils at 37.5° to 38.5° C. at a pressure of 12 mm. The yield is approximately 80% of theoretical.

The Ullmanns Encyclopedia cited contains a general description of the high pressure polymerization of ethylene and this process is disclosed in our Specification in the paragraph bridging pages 5 and 6 of the Specification.

As methoxyacetic acid vinyl ester itself has a molecular mass regulating effect, the copolymers with a high percentage of claimed comonomers can be obtained without the addition of any other molecular mass regulator. The additional use of molecular mass regulators such as hydrocarbons, aldehydes or ketones is necessary to synthesize copolymers with a low comonomer content; i.e. a percentage of less than approximately 15 weight percent, and to synthesize copolymers with a low molecular mass; i.e. less than approximately 1500 g/mole. They are used in an amount of 0.05 to 10 weight percent, based on the monomer mixture. A particularly suitable molecular mass regulator is propionaldehyde. In order to obtain polymers with the claimed composition, monomer mixtures containing 95 to 50 weight percent of ethylene and 5 to 50 weight percent of methoxyacetic acid vinyl ester are used. The polymers occur as colorless melts which solidify to waxy solids at room temperature.

Polymerization takes place in known high-pressure reactors, e.g. autoclaves or tubular reactors. Solvents can be contained in the reaction mixture, although solvent-free operation has proved particularly successful. Polymerization takes place preferably in tubular reactors.

The copolymers according to the invention are added to mineral oil distillates in the form of solutions containing 40 to 60 weight percent of copolymer (based on the solution). Aliphatic or aromatic hydrocarbons or hydrocarbon mixtures, e.g. gasoline fractions and, in particular, kerosene are suitable as solvents. The mineral oil distillates improved in their rheological properties through the new polymer compounds contain 0.001 to 2, preferably 0.005 to 0.5 weight percent of copolymer (related to the distillate). The copolymer can be used alone or together with other additives; for example dewaxing agents, corrosion inhibitors, antioxidants, and/or sludge inhibitors. It is also possible to use mixtures of the claimed copolymers whose components differ with regard to their composition and/or their average molecular mass.

The preparation of the new copolymers and their properties are described in the following Examples 1 to 7. Further Examples A to G relate to the use of the new copolymers as additives for mineral oil distillates. Naturally, it is not intended to limit the invention to the special variants described herein.

EXAMPLES 1 to 7

PREPARATION OF ETHYLENE-METHOXYACETIC-ACID VINYL ESTER COPOLYMERS

Ethylene and methoxyacetic acid vinyl ester are polymerized in an autoclave, if necessary with the addition of propanal as a molecular mass regulator. To this end the monomer mixture, to which tertiary butylperoxypivalate dissolved in a gasoline fraction has been added as an initiator, is fed into the reactor at reaction pressure. The residence period of the reactants in the autoclave is about 80 seconds.

The polymerization conditions and the properties of the copolymers obtained are compiled in Table 1. The methoxyacetic acid vinyl ester content of the copolymers is determined by H-NMR spectroscopy, their viscosity at 140° C. measured with a Rotovisco System MV II (Manufacturer: Haake, Karlsruhe).

TABLE 1

Synthesis of ethylene-methoxyacetic acid vinyl ester copolymers

| Reaction conditions | Examples | | | | | | |
|---|---|---|---|---|---|---|---|
| | 1 | 2 | 3 | 4 | 5 | 6 | 7 |
| Reaction pressure (MPa) | 150 | 150 | 150 | 200 | 200 | 200 | 200 |
| Reaction temp. (°C.) | 230 | 230 | 230 | 160 | 160 | 160 | 160 |
| Initiator feed (wt. ppm)[1] | 156 | 266 | 2419 | 135 | 100 | 134 | 131 |
| Composition of the reaction mixture (wt. %) | | | | | | | |
| Ethylene | 89.4 | 81.9 | 71.7 | 72.3 | 76.1 | 71.3 | 70.1 |
| MOAVE[2] | 9.2 | 18.1 | 28.3 | 27.7 | 23.9 | 27.3 | 26.9 |
| Propanal | 1.4 | — | — | — | — | 1.4 | 3.0 |
| Conversion (%)[3] | 15.6 | 16.8 | 21.9 | 14.4 | 8.5 | 9.8 | 9.8 |

| Designation of the polymers | Examples | | | | | | |
|---|---|---|---|---|---|---|---|
| | 1 | 2 | 3 | 4 | 5 | 6 | 7 |
| MOAVE (wt. %) | 11.4 | 19.7 | 28.3 | 31.8 | 28.1 | 31.5 | 31.3 |
| Viscosity at 140° C. (mPa · s) | 260 | 200 | 80 | 180 | 200 | 85 | 45 |
| $M_n$[4] (g × mole$^{-1}$) | 2000 | 1850 | 1500 | 1800 | 1830 | 1510 | 1300 |

[1]related to the reaction mixture
[2]Methoxyacetic acid vinyl ester
[3]related to monomer feed
[4]determined by steam phase osmometry

EXAMPLES A-G

EFFECTIVENESS OF THE ETHYLENE-METHOXYACETIC ACID VINYL ESTER COPOLYMERS AS MINERAL OIL ADDITIVES

In the following Examples A-F, the effectiveness of various ethylene-methoxyacetic acid vinyl ester copolymers as additives for mineral oils and mineral oil distillates is described using the CFPP (cold filter plugging point) test. A comparison of the effectiveness of an ethylenevinyl acetate copolymer is given in Example G. The test is conducted according to DIN 51428; it is also published in J. of the Inst. of Petr., Volume 52, June 1966, Pages 173 to 185.

For the tests, three middle distillates M1, M2 and M3 are taken which are characterized by the properties listed in Table 2. The middle distillates M2 and M3 can be classified as low-cut middle distillate fractions which cease boiling at a high temperature.

Table 3 shows that the copolymers according to the invention exhibit a considerably improved effectiveness in middle distillate fractions which cease boiling at a high temperature compared with the conventional ethylene-vinyl acetate copolymers. In addition, the claimed copolymers are also noticeably more effective than the known additives even when used in small amounts in conventional middle distillate fractions.

TABLE 2
Analysis of the middle distillates

|  |  | M 1 | M 2 | M 3 |
|---|---|---|---|---|
| Boiling analysis | (°C.) |  |  |  |
| Start of boiling |  | 175 | 163 | 162 |
| 5% |  | 196 | 194 | 196 |
| 50% |  | 296 | 273 | 274 |
| 90% |  | 363 | 375 | 367 |
| End of boiling |  | 264 | 385 | 382 |
| Pour point | (°C.) | −12 | −9 | −6 |
| CFPP value | (°C.) | −3 | −1 | −1 |
| n-paraffin content (gas chromatography) | (%) | 30.5 | 36.4 | 24.8 |

TABLE 3

Effectiveness of the ethylene methoxyacetic acid vinyl ester copolymers according to the invention

| Example | Polymer from example | concentration in (ppm) | CFPP value(°C.) M 1 | M 2 | M 3 |
|---|---|---|---|---|---|
| A | 2 | 25 | −9 | — | — |
|  |  | 50 | −10 | — | — |
|  |  | 100 | −13 | — | −8 |
|  |  | 200 | −15 | −7 | — |
| B | 3 | 25 | −10 | — | — |
|  |  | 50 | −13 | +2 | −1 |
|  |  | 100 | — | — | — |
|  |  | 200 | — | — | — |
| C | 4 | 25 | −11 | — | — |
|  |  | 50 | −13 | — | — |
|  |  | 100 | −15 | — | −3 |
|  |  | 200 | −16 | −2 | — |
| D | 5 | 25 | −11 | — | — |
|  |  | 50 | −13 | — | — |
|  |  | 100 | −14 | — | −10 |
|  |  | 200 | −16 | — | — |
| E | 6 | 25 | −11 | — | — |
|  |  | 50 | −14 | — | — |
|  |  | 100 | −15 | — | −3 |
|  |  | 200 | −18 | — | −3 |
| F | 7 | 25 | −11 | — | — |
|  |  | 50 | −13 | — | — |
|  |  | 100 | −15 | — | −2 |
|  |  | 200 | −18 | 0 | −4 |
| G | EVA Copolymer | 25 | −6 | — | — |
|  |  | 50 | −11 | 2 | −1 |
|  |  | 100 | −15 | 2 | −1 |
|  |  | 200 | — | 1 | 0 |

We claim:

1. A method of improving the flowability of mineral oil distillates comprising the addition, to said mineral oil distillate, of a copolymer comprising 95 to 50 percent by weight ethylene and 5 to 50 percent by weight methoxyacetic acid vinyl ester having an average molecular mass (Mn) of 500 to 10,000 g mol$^{-1}$.

2. The method of claim 1 wherein said copolymer comprises 90 to 65 percent by weight ethylene and 10 to 35 percent by weight methoxyacetic acid vinyl ester.

3. The method of claim 1 wherein said mineral oil distillate is a middle distilate.

4. The method of claim 1 wherein said copolymer is present in an amount of 0.001 to 2 percent by weight based on said distillates.

5. The method of claim 4 wherein said copolymer is present in an amount of 0.005 to 0.5% by weight based on said distillate.

6. The method of claim 2 wherein said copolymer is present in an amount of 0.001 to 2 percent by weight based on said distillates.

7. The method of claim 6 wherein said copolymer is present in an amount of 0.005 to 0.5 percent by weight based on said distillate.

* * * * *